Patented Oct. 5, 1948

2,450,765

UNITED STATES PATENT OFFICE 2,450,765

CYCLOHEXYLCARBINYL THIOCYANO ESTERS

Rupert C. Morris, Berkeley, Alva V. Snider, Richmond, and Paul H. Williams, Berkeley, Calif., assignors to Shell Development Company, San Francisco, Calif., a corporation of Delaware No Drawing. Application July 7, 1944,
Serial No. 543,959

9 Claims. (Cl. 167—30)

This invention relates to novel thiocyano esters and more particularly pertains to the 1-alkyl cyclohexylcarbinyl esters of the thiocyano-substituted aliphatic acids. The invention relates further to a novel method for the preparation of such esters.

The novel thiocyano esters of the invention have the general formula

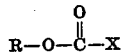

wherein X is a thiocyano-substituted hydrocarbon radical and R represents a 1-alkyl cyclohexylcarbinyl-radical, i. e. a radical having the carbon skeleton

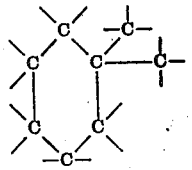

It is characteristic of the presently described compounds, therefore, that they contain a nuclear quaternary carbon atom, i. e. a carbon atom of the cyclohexyl nucleus which is attached to four other carbon atoms. The presence of the said nuclear quaternary carbon atom imparts to the novel compounds of the invention properties not possessed by other thiocyano esters and thus permits their application to new uses and in many cases renders them uniquely effective when applied to uses for which compounds of the same general type are known to be suitable. The said characteristic structural grouping also renders the compounds soluble in or compatible with numerous other compounds of related structure and thereby makes possible the incorporation of the compounds of the invention in a variety of useful compositions. The herein described thiocyano esters are for example excellent insecticidal toxicants and are superior in this respect to other members of the class of compounds comprising the thiocyano aliphatic acid esters. They are particularly desirable as insecticides or as constituents of insecticidal compositions, since, in addition to being highly toxic to insects, they have an inoffensive odor, are light-stable, are compatible with or soluble in light paraffinic mineral oils such as kerosene and are not damaging in any way to fabrics, wall paper, painted walls, etc. The compounds may be used alone or in combination with other insecticidal toxicants such as pyrethrum or rotenone. They may be used advantageously in kerosene solution. Since the thiocyano esters of the invention have superior surface active properties, they may be used as wetting agents or in the preparation of derivatives which are active and useful as wetting agents. They may also be used to advantage as plasticizers, as addition agents for rubber, as flotation agents in the concentration of minerals and in the production of other valuable organic compounds.

As stated, the herein described novel thiocyano compounds comprise in general the 1-alkyl cyclohexylcarbinyl esters of the thiocyano-substituted aliphatic acids and have the general formula

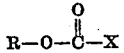

wherein R represents the 1-alkyl cyclohexylcarbinyl radical and X is a thiocyano-substituted hydrocarbon radical. The compound 1-methyl cyclohexylcarbinyl thiocyano acetate,

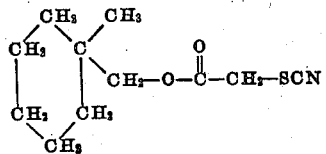

is therefore representative of the class of compounds covered by the invention. The scope of the invention is, however, such as to include a number of the homologues and derivatives of this parent compound. Thus the methyl group substituted on the No. 1 carbon atom of the cyclohexyl nucleus may be replaced by a variety of alkyl groups such as the methyl, ethyl, n-propyl, isopropyl, butyl, amyl, hexyl, heptyl, octyl, nonyl and decyl groups and the like. The cyclohexyl nucleus may also be substituted on the other carbon atom by a variety of groups, particularly by alkyl radicals. These may be substituted on any of the carbon atoms of the cyclohexyl nucleus which bear a replaceable hydrogen atom. A particular class of cyclohexylcarbinyl thiocyano-substituted aliphatic acid esters, the members of which have particularly valuable properties and are especially active insecticidal toxicants, comprise those compounds wherein the No. 2 and the No. 5 carbon atoms of the cyclohexyl nucleus are linked through at least one methylene group or substituted methylene group, thereby forming a compound having a bicyclic structure, e. g. 1-methyl 2,5-endomethylene cyclohexylcarbinyl thiocyano acetate,

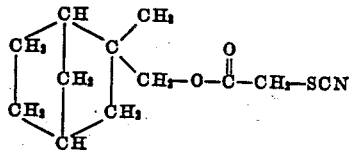

Although the radical represented by X in the hereinabove defined general formula

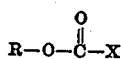

may be any thiocyano-substituted hydrocarbon radical, it is preferably a mono-, di-, or poly-thiocyano-substituted aliphatic radical derived from the unsaturated or saturated aliphatic acid of corresponding structure. The resulting preferred compounds are, therefore, the alkyl-substituted cyclohexyl esters of the mono-, di-, or poly-thiocyano-substituted saturated or unsaturated aliphatic acids. The aliphatic acid residue may be of any desired molecular weight, depending upon the use to which the ester is to be put. The alkylcyclohexylcarbinyl esters of the lower thiocyano aliphatic acids having from 2 to 6 carbon atoms may, for example, be particularly effective for use as insecticidal toxicants while the cyclohexylcarbinyl esters of the higher acids, i. e. those having up to about 20 carbon atoms, may be more suitable for use as wetting agents.

Representative acids which may be used in forming the desired thiocyano esters include the $C_3$ to $C_{20}$ straight chain and branched chain saturated and unsaturated aliphatic acids such as acetic acid, propionic acid, butyric acid, valeric acid, caproic acid, capric acid, undecylic acid, undecylenic acid, lauric acid, myristic acid, palmitic acid, oleic acid, stearic acid, arachidic acid, and their homologues and analogues together with suitably substituted derivatives thereof, such as hydroxyacetic acid, lactic acid, alpha-hydroxy-n-butyric acid, alpha-hydroxyisovaleric acid, ricinoleic acid, etc.

The following cyclohexylcarbinyl thiocyano esters illustrate the compounds of the invention:

1-methyl-cyclohexylcarbinyl thiocyano acetate
1-methyl - 6 - ethyl-cyclohexylcarbinyl thiocyano propionate
1-ethyl-3,5-dimethyl-6-propyl cyclohexylcarbinyl thiocyano acetate
1,5-dimethyl-cyclohexylcarbinyl thiocyano acetate
1-ethyl-2,4-dimethyl-6-propyl cyclohexylcarbinyl thiocyano acetate
1,4-dimethyl-cyclohexylcarbinyl thiocyano acetate
1,3,5 - trimethyl - cyclohexylcarbinyl thiocyano butyrate
1,2,4 - trimethyl - cyclohexylcarbinyl thiocyano butyrate
1,3,5 - trimethyl-6-ethyl-cyclohexylcarbinyl thiocyano acetate
1,2,4 - trimethyl-6-ethyl-cyclohexylcarbinyl thiocyano acetate
1 - methyl-2,5-endomethylene-cyclohexylcarbinyl thiocyano acetate
1,3,5-trimethyl-cyclohexylcarbinyl thiocyano acetate
1,2,4-trimethyl-cyclohexylcarbinyl thiocyano acetate
1-methyl-6-ethyl-2,5-endomethylene-cyclohexylcarbinyl thiocyano acetate
1,5 - dimethyl-2,5-endomethylene-cyclohexylcarbinyl thiocyano butyrate
1 - methyl - 2,5-endoethylene-cyclohexylcarbinyl thiocyano propionate and
1,3,5 - trimethyl-2,5-endoethylene-cyclohexylcarbinyl thiocyano acetate.

The compounds of the invention may be prepared in any manner heretofore known to the art for preparing the thiocyano aliphatic acid esters of organic carbinols. They may be prepared, for example, by reacting inorganic thiocyano acetates with the sulfated esters of the appropriate alcohols. However, a preferred method of preparation generally comprises reacting a 1-alkyl cyclohexylcarbinol, e. g. 1-methyl cyclohexylcarbinol, with a suitable halogen-substituted acylating agent, and reacting the ester so produced with an inorganic thiocyanate in order to obtain the desired thiocyano ester. These reactions may be represented by the following equations wherein R is a 1-alkyl cyclohexyl-carbinyl radical:

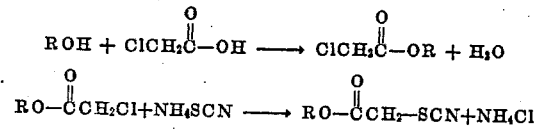

Suitable halogen-substituted acylating agents include the halogen-substituted aliphatic carboxylic acids, e. g. the chloro-, bromo- or iodo-substituted aliphatic carboxylic acids, including monochloroacetic acid, dichloroacetic acid, trichloroacetic acid, alpha-chloropropionic acid, beta-chloropropionic acid, the dichloropropionic acids, the dichlorobutyric acids, the chloroisovaleric acids, the chlorolauric acids, the chloromyristic acids, the chlorostearic acids, the chlorooleic acids, the chlororicinoleic acids, the chloromalonic acids, and the corresponding bromo- or iodo-substituted acids. Mixtures may be utilized if desired, as may the anhydrides of the halogen-substituted carboxylic acids, or the acyl halides of these halogen-substituted carboxylic acids.

Suitable inorganic thiocyanates for use in the synthesis include those which are of a sufficiently reactive nature to undergo reaction with a halogen-substituted aliphatic acid. It is also desirable that the thiocyanates be relatively soluble in the reaction medium. In general, ammonium thiocyanate, the thiocyanates of the alkali metals, and the thiocyanates of the alkaline earth metals represent suitable reagents for use in effecting the conversion of the halogen-substituted esters to the thiocyano-substituted esters. Ammonium thiocyanate, sodium thiocyanate and potassium thiocyanate are preferred members of this group.

It may be desirable, in some instances, when effecting the esterification of an alkyl-substituted cyclohexanol with an acylating agent, e. g. a halogen-substituted aliphatic carboxylic acid, to make use of an esterification catalyst to accelerate the reaction. Almost any of the esterification catalysts known to the art may be used for this purpose. Suitable catalysts include, for example, the mineral acids such as sulfuric acid or phosphoric acid. Para-toluene sulfonic acid represents a preferred catalyst, since it exerts the desired catalytic action without producing any substantial charring of the constituents of the reaction mixture. The catalysts are active in small amounts, an amount of catalyst which is equal to but about 1% by weight of the alcohol used being a sufficient amount in most cases.

Either step or stage of the above-described preferred method for preparing the presently disclosed thiocyano esters may be carried out in the presence of an inert solvent, such as methanol, ethanol, isopropanol, butanol, isobutanol, acetone, dioxane, methylisobutyl ketone, ethyl acetate, benzene, toluene, xylene, hexanes, octanes, isopropyl ether, hydrocarbon fractions, such as gasoline, etc. It is usually preferred to carry out the second step, i. e. the conversion of the chloro ester to the thiocyano ester, in an alcoholic medium. Each step may be carried out at any temperature within the range of between about 0° C. and about 250° C., and preferably in the range of between about 50° C. and about 150° C. It may be desirable to carry out the reactions of either step in the absence of oxygen, as, for example, in an atmosphere of carbon dioxide. The products of each stage are preferably vacuum distilled, although if only a crude product is desired no distillation is needed.

In a preferred method for preparing the thiocyano esters of the invention from the corresponding carbinols, a suitable carbinol, e. g. 1,3,5-trimethyl cyclohexylcarbinol, may be heated at reflux temperature with a molar excess of a halogen-substituted acid, e. g. chloroacetic acid, the operation being preferably carried out using apparatus provided with means for separating water from the reaction mixture as it is formed. If desired, benzene may be added to the said mixture in order to facilitate this dehydrating process by acting as an entraining agent for the water formed. When the reaction is complete the reaction product may be separated from the reaction mixture by any suitable means, as by distillation, preferably distillation under reduced pressure. The chloro acetate obtained in this manner may then be reacted with a molar excess of an inorganic thiocyanate, e. g. ammonium thiocyanate, in alcoholic solution. The alcohol may then be separated from the reaction mixture by distillation, the product washed with a suitable solvent for the inorganic constituents of the reaction mixture, and fractionally distilled to separate the thiocyano acetate in a pure state.

The 1-alkyl cyclohexylcarbinol utilized in the preparation of the presently described thiocyano esters may be conveniently prepared from comparatively readily available starting materials by a novel series of reactions, the first of which comprises the condensation of a conjugated diene with a mono-olefinic compound of suitable structure. This results in the formation of an unsaturated cyclic carbonylic compound which may be reduced to form the desired cyclohexyl carbinol. Suitable conjugated dienes which may be thus employed comprise butadiene, the alkyl-substituted butadienes, pentadiene, the alkyl-substituted pentadienes, particularly 2-methyl pentadiene, cyclopentadiene, the methyl cyclopentadienes, cyclohexadiene, the methyl-substituted cyclohexadienes, and the like. Suitable olefinic compounds comprise those alpha,beta-unsaturated carbonylic compounds having an alkyl group substituted upon the alpha carbon atom and having the general formula

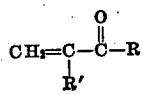

wherein R represents a hydrogen atom or an alkyl group and R' represents an alkyl group, preferably a methyl group. Suitable olefinic compounds therefore include methacrolein,

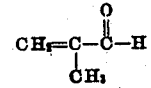

2-methyl-3-ethyl acrolein,

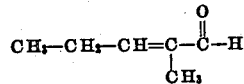

and methyl isopropenyl ketone,

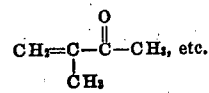

A preferred modification of the herein described novel procedure for the preparation of the 1-alkyl cyclohexylcarbinols may be represented by the following. An alpha,beta-unsaturated carbonylic compound containing an alkyl group substituent on the alpha carbon atom may be reacted with an approximately equivalent amount of a conjugated diene, the condensation being preferably effected in the presence of an oxidation inhibitor. The reaction may be carried out at atmospheric pressure or at superatmospheric pressures and in either the liquid or vapor phase. The reaction temperature employed may vary from about 50° C. to about 175° C., but is preferably between about 90° C. and 110° C., when operating in the liquid phase. Under these circumstances the alpha,beta-unsaturated carbonylic compound adds to the conjugated diene to form an unsaturated cyclic compound which may be separated from the reaction mixture by any suitable means, as by fractional distillation under diminished pressure.

The unsaturated cyclic compound obtained in this manner may be converted to the saturated carbinol of corresponding structure by treatment with a suitable reducing agent. This reduction step may be carried out particularly effectively by treating the said unsaturated cyclic carbonylic compound with hydrogen at elevated temperatures, at elevated pressures, and in the presence of a suitable hydrogenation catalyst. The particular reaction conditions employed may vary with the starting materials and catalyst used. The reaction temperature may, however, be between about 100° C. and about 500° C., preferably between about 150° C. and about 250° C., while suitable operating pressures lie within the range of between about 300 p. s. i. and about 3,000 p. s. i., preferably between about 500 p. s. i. and about 1500 p. s. i. Any of the usual hydrogenation catalysts may be employed, although active nickel, particularly that form of active nickel which is commonly known as Raney nickel, may be employed with particular advantage. The cyclic carbinol which is a product of the hydrogenation step may usually be separated from the reaction mixture by removing the nickel catalyst from the reaction mixture and then distilling the catalyst-free mixture.

The cyclic carbinols thus obtained may be esterified by substantially the same process as is described hereinabove for the preparation of esters of cyclic carbinols by reaction of the said carbinols with aliphatic acids or suitable derivatives thereof. They may be esterified, for example, by reacting the 1-alkyl cyclohexylcarbinol with a halogen-substituted aliphatic acylating agent, and reacting the halogen-containing ester so produced with a metal thiocyanate in order to obtain the desired thiocyano ester.

This preferred process for preparing the novel compounds of the invention from a conjugated diene and an alpha,beta-unsaturated carbonylic compound containing an alkyl group substituent on the alpha carbon atom may be illustrated by the process which may be employed in preparing trimethyl cyclohexylcarbinyl thiocyano acetate from 2-methyl pentadiene and methacrolein. In this embodiment a mixture comprising approximately equimolecular amounts of methacrolein and 2-methyl pentadiene may be heated at reflux temperature and at atmospheric pressure for a period of several hours. At the end of the heating period the reaction mixture may be fractionated in order to obtain the unsaturated cyclic aldehyde product, i. e. the 1,3,5-trimethyl tetrahydrobenzaldehyde and/or its isomer, 1,2,4,-trimethyl tetrahydrobenzaldehyde. The reduction of the said trimethyl tetrahydrobenzaldehydes may be effected by reaction with hydrogen in the presence of a Raney nickel catalyst at a temperature of about 175° C. and a pressure of about 1,000 p. s. i., the trimethyl cyclohexylcarbinol product being separated from the reaction mixture by filtering the said reaction mixture to remove the Raney nickel catalyst and fractionally distilling the catalyst-free filtrate. The carbinol may then be esterified by reacting it with a molar excess of choloroacetic acid in the presence of a suitable acidic esterifying agent such as para-toluene sulfonic acid, the esterification being preferably carried out under dehydrating conditions. When the reaction is complete the products may be fractionally distilled under diminished pressure, thereby isolating the desired trimethyl cyclohexylcarbinyl chloroacetate. This chloroacetate may be converted to the thiocyano acetate by reacting it with a molar excess, e. g. a 50% molar excess, of ammonium thiocyanate in a solvent comprising 95% ethanol. The trimethyl cyclohexylcarbinyl thiocyano acetate product may then be separated from the reaction mixture by distilling off the ethanol solvent, washing with water and fractionally distilling the product.

The process of the invention may be illustrated by the following examples.

*Example I*

A mixture comprising approximately equimolecular amounts of methacrolein and 2-methyl pentadiene was heated at reflux temperature and at atmospheric pressure for a period of several hours. At the end of the heating period the reaction mixture was fractionated in order to obtain the unsaturated cyclic aldehyde product, i. e. the 1,3,5-trimethyl tetrahydrobenzaldehyde and/or its isomer, 1,2,4-trimethyl tetrahydrobenzaldehyde. The reduction of the trimethyl tetrahydrobenzaldehydes was effected by reaction with hydrogen in the presence of a Raney nickel catalyst at a temperature of about 175° C. and a pressure of about 1,000 p. s. i., the trimethyl cyclohexylcarbinol product (B. P. 111° C. at 50 mm.) being separated from the reaction mixture by filtering to remove the Raney nickel catalyst and fractionally distilling the catalyst-free filtrate. The carbinol was then esterified by reacting it with a molar excess of chloroacetic acid in the presence of paratoluene sulfonic acid. This reaction was carried out under dehydrating conditions, by using benzene as an entraining agent for the water formed as a product of the esterification reaction, and carrying out the reaction at reflux temperature while separating the benzene-water azetrope by using a distillation column equipped with a phase-separating head. When the reaction was complete the products were fractionally distilled under diminished pressure, to separate the trimethyl cyclohexylcarbinyl chloroacetate (B. P. 136° C to 138° C. at 6 mm.). The chloroacetate was then converted to the thiocyano acetate by reacting it with a 50% molar excess of ammonium thiocyanate in 95% ethanol. The trimethyl cyclohexylcarbinyl thiocyano acetate product was then separated from the reaction mixture by distilling off the ethanol solvent, washing with water and fractionally distilling the product. This thiocyano ester boiled at 169° C. to 171° C. at a pressure of 3 mm. It had a sulfur content of 12.50% (calculated 12.55%).

*Example II*

1-methyl endomethylene cyclohexylcarbinyl thiocyano acetate was prepared from cyclopentadiene and methacrolein by condensing approximately equimolecular amounts of cyclopentadiene and methacrolein and hydrogenating the aldehyde product substantially as described in Example I. The resulting carbinol (B. P. 139° C.–140° C. at 80 mm.) was then reacted with chloroacetyl chloride and the 1-methyl endomethylene cyclohexylcarbinyl chloroacetate (B. P. 103° C.–105° C. at 1.5 mm.) thus produced converted to the thiocyano acetate (B. P. 151° C.–153° C. at 0.8 mm.), by reaction with sodium thiocyanate.

*Example III*

In a like manner 1-ethyl-3,5-dimethyl-6-propyl cyclohexylcarbinyl thiocyano acetate may be prepared using 2-methyl pentadiene, 2-ethyl-3-propyl acrolein, chloroacetyl chloride and ammonium thiocyanate as starting materials, and 1,3,5-trimethyl-6-ethyl cyclohexylcarbinyl thiocyano propionate may be prepared from methyl pentadiene and 2-methyl-3-ethyl acrolein, chloropropionyl chloride and a metal thiocyanate.

*Example IV*

1-methyl endoethylene cyclohexylcarbinyl thiocyano acetate is prepared by condensing cyclohexadiene-1,3 and methacrolein, hydrogenating the product over an active nickel catalyst, esterifying the ester thus produced by reaction with chloroacetyl chloride to give a chloroacetate, and reacting the said chloroacetate with ammonium thiocyanate.

*Example V*

1-methyl cyclohexyl methyl carbinyl thiocyano acetate is similarly prepared from butadiene, methyl isopropenyl ketone, chloracetic anhydride and ammonium thiocyanate.

*Example VI*

1-methyl cyclohexylcarbinyl thiocyano butyrate is prepared from 1-methyl cyclohexylcarbinol by reacting the said carbinol with a slight molar excess of chlorobutyryl chloride at a temperature of from about 80° C. to about 100° C. The reaction mixture is then cooled, washed with water, then washed with a dilute aqueous solution of sodium carbonate and distilled. The product, i. e., the 1-methyl cyclohexylcarbinyl chlorobutyrate, is then reacted with an amount of ammonium thiocyanate which is slightly in excess of that amount theoretically required to react with the said chlorobutyrate, the reaction being carried out in alcoholic solution at reflux temperature for a period of about 1 hour. The ammonium chloride which is formed as a product of the reaction is then filtered off and the filtrate distilled to remove the alcohol solvent. Distillation of the residue under diminished pressure results in the separation of 1-methyl cyclohexylcarbinyl thiocyano butyrate.

*Example VII*

1,3,5 - trimethylcyclohexylcarbinyl thiocyano stearate is prepared from 1,3,5-trimethylcyclohexylcarbinol and bromostearic acid using the procedure substantially as outlined in Example VI.

We claim as our invention:
1. The 1-alkyl-2,5-endoethylene cyclohexylcarbinyl esters of the thiocyano-substituted aliphatic acids.
2. The 1-alkyl-2,5-endomethylene cyclohexylcarbinyl esters of the thiocyano-substituted aliphatic acids.
3. The 1-alkyl cyclohexylcarbinyl esters of the thiocyano-substituted aliphatic acids.
4. An insecticidal composition comprising a 1-methyl cyclohexylcarbinyl ester of a thiocyano-substituted aliphatic acid and a carrier therefor.
5. The thiocyano acetate of 1,3,5-trimethylcyclohexylmethanol.
6. The thiocyano acetate of 1-methyl-2,5-endomethylene cyclohexylmethanol.
7. The thiocyano acetate of 1-methyl-2,5-endoethylene cyclohexylmethanol.
8. The thiocyano acetates of the 1-methylcyclohexylmethanols.
9. The ester of a thiocyano-substituted aliphatic carboxylic acid and a 1-alkyl cyclohexylmethanol.

RUPERT C. MORRIS.
ALVA V. SNIDER.
PAUL H. WILLIAMS.

REFERENCES CITED

The following references are of record in the file of this patent:

UNITED STATES PATENTS

| Number | Name | Date |
|---|---|---|
| 2,217,611 | Borglin | Oct. 8, 1940 |
| 2,217,612 | Borglin | Oct. 8, 1940 |
| 2,217,613 | Borglin | Oct. 8, 1940 |
| 2,217,614 | Borglin | Oct. 8, 1940 |
| 2,217,615 | Borglin | Oct. 8, 1940 |
| 2,227,058 | Borglin | Dec. 31, 1940 |
| 2,339,818 | Rummelsburg | Jan. 25, 1944 |
| 2,352,606 | Alder et al. | July 4, 1944 |